United States Patent
Tong et al.

(10) Patent No.: US 8,314,640 B2
(45) Date of Patent: Nov. 20, 2012

(54) DRIVER CIRCUIT

(75) Inventors: Song-Lin Tong, Shenzhen (CN); Qi-Yan Luo, Shenzhen (CN); Peng Chen, Shenzhen (CN); Yun Bai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 60 days.

(21) Appl. No.: 13/110,917

(22) Filed: May 19, 2011

(65) Prior Publication Data

US 2012/0176166 A1    Jul. 12, 2012

(30) Foreign Application Priority Data

Jan. 11, 2011  (CN) .......................... 2011 1 0004508

(51) Int. Cl.
*H03L 7/00* (2006.01)
(52) U.S. Cl. .......................... 327/142; 327/108; 327/198
(58) Field of Classification Search .................... 326/82, 326/83; 327/108–112, 142, 143, 198
See application file for complete search history.

(56) References Cited

U.S. PATENT DOCUMENTS

| 5,767,631 A * | 6/1998 | Konopka et al. ............... 315/307 |
| 2005/0068085 A1* | 3/2005 | Nalbant ........................ 327/337 |
| 2007/0018194 A1* | 1/2007 | Miki et al. ..................... 257/133 |

* cited by examiner

*Primary Examiner* — Lincoln Donovan
*Assistant Examiner* — William Hernandez
(74) *Attorney, Agent, or Firm* — Altis Law Group, Inc.

(57) ABSTRACT

A driver circuit drives a pulse width modulation (PWM) controller. The driver circuit includes an enabling circuit, a power supply input control circuit, a stabilizing circuit, and a discharge circuit. The stabilizing circuit is electrically connected to the PWM controller. The power supply input control circuit is electrically connected between the enabling circuit and the stabilizing circuit. The discharge circuit is electrically connected between the stabilizing circuit and the ground. In response to the driver circuit working in normal operation, the enabling circuit enables the power supply input control circuit to output a working voltage to the stabilizing circuit, and in response to the process of the driver circuit restarting, the enabling circuit enables the power supply input to stop outputting power supply to the stabilizing circuit. The discharge circuit leads a residual voltage of the stabilizing circuit to the ground, during the process of the driver circuit being restarted.

10 Claims, 1 Drawing Sheet

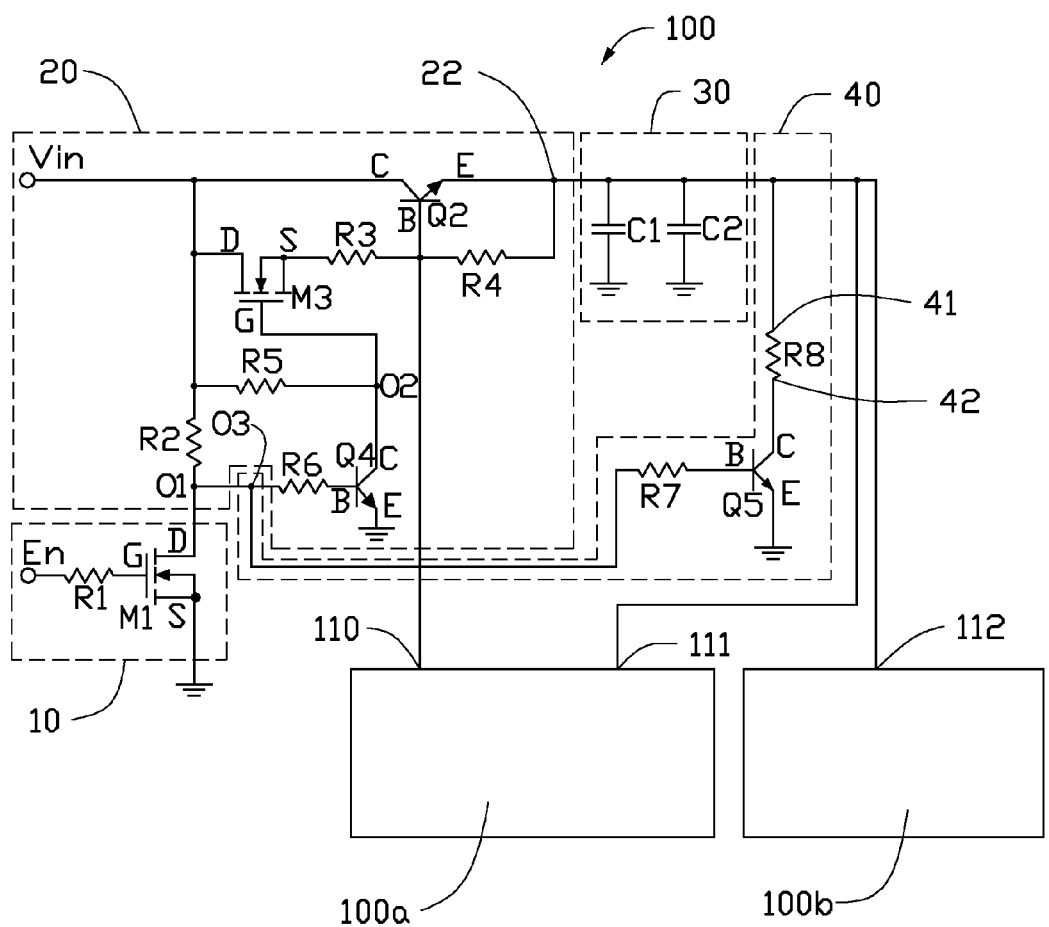

DRIVER CIRCUIT

BACKGROUND

1. Technical Field

The disclosure relates to a driver circuit.

2. Description of Related Art

A power supply VCC of a pulse width modulation (PWM) controller is typically provided by an input voltage Vin of a CPU. The input voltage Vin and the power supply VCC have a certain supply timing requirements that dictates that the input voltage Vin must start to supply power before the power supply VCC supplies power. However, because a stabilized capacitance connected between the input voltage Vin and the power supply VCC will store a part of the current, when a computer restarts, the stabilized capacitance discharges. Thus, a residual power supply provided by the stabilized capacitance restarts the PWM controller before the input voltage Vin starts to supply power, which not only interferes the PWM controller function, but also could cause the PWM controller to burnout.

Therefore, it is desired to provide a driver circuit to overcome the above-described problem.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

The drawing is a schematic view of a driver circuit, according to an exemplary embodiment.

DETAILED DESCRIPTION

Embodiments of the disclosure will now be described in detail below, with reference to the drawing.

Referring to the drawing, a driver circuit 100, according to an exemplary embodiment, is used for driving a pulse width modulation (PWM) controller 100a and a microchip driver 100b for driving a microchip (not shown). The PWM controller 100a includes a control terminal 110 and a first power supply input 111. The microchip driver 100b includes a second power supply input 112. The driver circuit 100 includes an enabling circuit 10, a power supply input control circuit 20, a stabilizing circuit 30, and a discharge circuit 40.

The power supply input control circuit 20 is electrically connected between the enabling circuit 10 and the stabilizing circuit 30. The stabilizing circuit 30 is electrically connected to both the PWM controller 100a and the microchip driver 100b. When the driver circuit 100 is working normally, the enabling circuit 10 is configured for enabling the power supply input control circuit 20 to output a working voltage to the stabilizing circuit 30. In addition, the enabling circuit 10 enables the power supply input control circuit 20 to stop outputting power to the stabilizing circuit 30 during the process of the driver circuit 10 being restarted. The discharge circuit 40 is electrically connected between the stabilizing circuit 30 and the ground. During the process of the driver circuit 10 being restarted, the discharge circuit 40 is configured for leading the residual voltage of the stabilizing circuit 30 to the ground.

The enabling circuit 10 includes an enabling source En, a first resistance R1, and a first NMOS transistor M1. A gate G of the first NMOS transistor M1 is electrically connected to the enabling source En through the first resistance R1, and a source S of the first NMOS transistor M1 is grounded.

The power supply input control circuit 20 includes a power supply input Vin, a first npn transistor Q2, a power supply output 22, a second NMOS transistor M3, and a second npn transistor Q4. A drain D of the first NMOS transistor M1 is electrically connected to a power supply input Vin through a second resistance R2. A collector C of the first npn transistor Q2 is electrically connected to the power supply input Vin. An emitter E of the first npn transistor Q2 is electrically connected to the power supply output 22. A base B of the first npn transistor Q2 is electrically connected to a source S of the second NMOS transistor M3 through a third resistor R3 and is electrically connected to the power supply input Vin through a fourth resistor R4, and is also electrically connected to the control terminal 110 of the PWM controller 100a. A drain D of the second NMOS transistor M3 is electrically connected to the power supply input Vin. A gate G of the second NMOS transistor M3 is also electrically connected to the power supply input Vin through a fifth resistor R5. A base B of the second npn transistor Q4 is electrically connected to a first node O1 formed between the second resistor R2 and the drain D of the first NMOS transistor M1, in other words, the base B of the second npn transistor Q4 is electrically connected to the power supply input Vin through a sixth resistor R6 and the second resistor R2. The collector C of the second npn transistor Q4 is electrically connected to a second node O2 formed between the fifth resistor R5 and the gate G of the second NMOS transistor M3.

In the embodiment, the stabilizing circuit 30 includes a first capacitor C1 and a second capacitor C2, both of which are in a parallel connection between the power supply output 22 and the ground. In particular, an anode of the first capacitor C1 is electrically connected to the power supply output 22 and a cathode of the first capacitor C1 is grounded. An anode of the second capacitor C2 is electrically connected to the power supply output 22 and a cathode of the second capacitor C2 is grounded.

The discharge circuit 40 includes a third npn transistor Q5, a seventh resistor R7, and a split-voltage resistance R8. The split-voltage resist resistance R8 includes an input 41 and an output 42. A base B of the third npn transistor Q5 is electrically connected to a third node O3 formed between the sixth resistor R6 and the first node O1 through the seventh resistor R7. A collector C of the third npn transistor Q5 is electrically connected to the anode of the second capacitor C2 through the split-voltage resistance R8. In particular, the input 41 of the split-voltage resistance R8 is electrically connected to the anode of the second capacitor C2, the output 42 of the split-voltage resistance R8 electrically connected to the collector C of the third npn transistor Q5. An emitter E of the third npn transistor Q5 is grounded. Both the first power supply input 111 of the PWM controller 100 and the second power supply input 112 of the microchip driver 100b are electrically connected to the input 41 of the split-voltage resistance R8.

In the embodiment, a high logic "1" (high level voltage) is 5V and a low logic "0" (low level voltage). When the driver circuit 100 works in normal operation, the power supply input Vin gains a working voltage and the enabling terminal En of the enabling circuit 10 gains a high level voltage. As such, the first NMOS transistor M1 turns on. Both the base B of the second npn transistor Q4 and the base B of the third npn transistor Q5 gain a low level voltage. Therefore, both the second npn transistor Q4 and the third npn transistor Q5 shut off, and the gate G of the second NMOS transistor M3 gain a high level voltage, the second NMOS transistor M3 turns on, and the base B of the first npn transistor Q2 gains a high level voltage, the first npn transistor Q2 turns on. As such, the power supply input Vin of the power supply input control circuit 20 provides a working voltage to the first power supply input 111 of the PWM controller 100a and the second supply input 112 of the microchip driver 100b through the stabilizing circuit 30. At the same time, the PWM controller 100a controls the first npn transistor Q2 to work in a enhanced state via the control terminal 110.

During the process of the driver circuit 10 being restarted, the power supply input Vin receives a working voltage and the enabling terminal En of the enabling circuit 10 receives a lower level voltage. As such, the first NMOS transistor M1 shuts off. Both the base B of the second npn transistor Q4 and the base B of the third npn transistor Q5 receive a high level voltage. Therefore, both the second npn transistor Q4 and the third npn transistor Q5 turn on, and the gate G of the second NMOS transistor M3 receives a low level voltage. The second NMOS transistor M3 shuts off, and the base B of the first npn transistor Q2 receives a low level voltage, the first npn transistor Q2 shuts off. As such, the power supply input Vin of the power supply input control circuit 20 cannot provide the working voltage to the first power supply input 111 of the PWM controller 100a and the second supply input 112 of the microchip driver 100b. Furthermore, the third npn transistor Q5 turns on, a residual power supply provided by the first capacitor C1 and the second capacitor C2 of the stabilizing circuit 30 is lead to the ground via the third npn transistor Q5. As such, both the PWM controller 100a and the microchip driver 100b stop working.

While certain embodiments have been described and exemplified above, various other embodiments will be apparent to those skilled in the art from the foregoing disclosure. The disclosure is not limited to the particular embodiments described and exemplified, and the embodiments are capable of considerable variation and modification without departure from the scope of the appended claims.

What is claimed is:

1. A driver circuit for driving a pulse width modulation controller, and comprising:
   a stabilizing circuit being electrically connected to the pulse width modulation controller;
   an enabling circuit;
   a power supply input control circuit being electrically connected between the enabling circuit and the stabilizing circuit;
   a discharge circuit being electrically connected between the stabilizing circuit and the ground;
   wherein in response to the driver circuit working in normal operation, the enabling circuit enables the power supply input control circuit to output a working voltage to the stabilizing circuit, and in response to the process of the driver circuit restarting, the enabling circuit enables the power supply input control circuit to stop outputting power supply to the stabilizing circuit; the discharge circuit is configured for leading a residual voltage of the stabilizing circuit to the ground, during the process of the driver circuit being restarted.

2. The driver circuit of claim 1, wherein the enabling circuit comprises an enable source, a first resistance, and a first NMOS transistor, a gate G of the first NMOS transistor is electrically connected to the enable source through the first resistance, a source of the first NMOS transistor is grounded, the power supply input control circuit comprises a power supply input, a first npn transistor, a power supply output, a second NMOS transistor, and a second npn transistor, a drain of the first NMOS transistor is electrically connected to a power supply input Vin through a second resistance, a collector of the first npn transistor is electrically connected to the power supply input, an emitter of the first npn transistor is electrically connected to the power supply output, a base of the first npn transistor is electrically connected to a source of the second NMOS transistor through a third resistor and electrically connected to the power supply input through a fourth resistor, a drain of the second NMOS transistor is electrically connected to the power supply input, a gate of the second NMOS transistor is also electrically connected to the power supply input through a fifth resistor, a base of the second npn transistor is electrically connected to a first node formed between the second resistor and the drain of the first NMOS transistor, the collector of the second npn transistor is electrically connected to a second node formed between the fifth resistor and the gate of the second NMOS transistor.

3. The driver circuit of claim 2, wherein the pulse width modulation controller comprises a controlling terminal, the base of the first npn transistor is electrically connected to the controlling terminal of the pulse width modulation controller, when the driver circuit works in normal operation, the pulse width modulation controller controls the first npn transistor working in magnify state via the controlling terminal.

4. The driver circuit of claim 2, wherein the stabilizing circuit comprises a first capacitor and a second capacitor, an anode of the first capacitor is electrically connected to the power supply output and a cathode of the first capacitor is grounded, an anode of the second capacitor is electrically connected to the power supply output and a cathode of the second capacitor is grounded.

5. The driver circuit of claim 4, wherein the discharge circuit comprises a third npn transistor, a seventh resistor, and a split-voltage resistance, the split-voltage resistance comprises an input and an output, the input of the split-voltage resistance is electrically connected to the anode of the second capacitor, the output of the split-voltage resistance electrically connected to the collector of the third npn transistor, an emitter of the third npn transistor is grounded, a first power supply input of the pulse width modulation controller is electrically connected to the input of the split-voltage resistance.

6. A driver circuit for driving a pulse width modulation controller and a microchip driver, and comprising:
   a stabilizing circuit being electrically connected to the pulse width modulation controller;
   an enabling circuit;
   a power supply input control circuit being electrically connected between the enabling circuit and the stabilizing circuit;
   a discharge circuit being electrically connected between the stabilizing circuit and the ground;
   wherein in response to the driver circuit working in normal operation, the enabling circuit enables the power supply input control circuit to output a working voltage to the stabilizing circuit, and in response to the process of the driver circuit restarting, the enabling circuit enables the power supply input control circuit to stop outputting power supply to the stabilizing circuit; the discharge circuit is configured for leading a residual voltage of the stabilizing circuit to the ground, during the process of the driver circuit being restarted.

7. The driver circuit of claim 6, wherein the enabling circuit comprises an enable source, a first resistance, and a first NMOS transistor, a gate G of the first NMOS transistor is electrically connected to the enable source through the first resistance, a source of the first NMOS transistor is grounded, the power supply input control circuit comprises a power supply input, a first npn transistor, a power supply output, a second NMOS transistor, and a second npn transistor, a drain of the first NMOS transistor is electrically connected to a power supply input Vin through a second resistance, a collector of the first npn transistor is electrically connected to the power supply input, an emitter of the first npn transistor is electrically connected to the power supply output, a base of the first npn transistor is electrically connected to a source of the second NMOS transistor through a third resistor and electrically connected to the power supply input through a fourth resistor, a drain of the second NMOS transistor is electrically connected to the power supply input, a gate of the second NMOS transistor is also electrically connected to the power supply input through a fifth resistor, a base of the second npn transistor is electrically connected to a first node formed between the second resistor and the drain of the first NMOS transistor, the collector of the second npn transistor is electrically connected to a second node formed between the fifth resistor and the gate of the second NMOS transistor.

8. The driver circuit of claim 7, wherein the pulse width modulation controller comprises a controlling terminal, the base of the first npn transistor is electrically connected to the controlling terminal of the pulse width modulation controller, when the driver circuit works in normal operation, the pulse width modulation controller controls the first npn transistor working in magnify state via the controlling terminal.

9. The driver circuit of claim 7, wherein the stabilizing circuit comprises a first capacitor and a second capacitor, an anode of the first capacitor is electrically connected to the power supply output and a cathode of the first capacitor is grounded, an anode of the second capacitor is electrically connected to the power supply output and a cathode of the second capacitor is grounded.

10. The driver circuit of claim 9, wherein the discharge circuit comprises a third npn transistor, a seventh resistor, and a split-voltage resistance, the split-voltage resistance comprises an input and an output, the input of the split-voltage resistance is electrically connected to the anode of the second capacitor, the output of the split-voltage resistance electrically connected to the collector of the third npn transistor, an emitter of the third npn transistor is grounded, a first power supply input of the pulse width modulation controller is electrically connected to the input of the split-voltage resistance.

* * * * *